United States Patent Office 3,329,651
Patented July 4, 1967

3,329,651
PHENYLENE ANTIMONATE III POLYESTER CATALYSTS
Frank Dobinson, Chapel Hill, N.C., assignor to Monsanto Company, St. Louis, Mo., a corporation of Delaware
No Drawing. Filed Aug. 10, 1964, Ser. No. 388,676
17 Claims. (Cl. 260—45.8)

This invention relates to an improved method for the preparation of high molecular weight polyesters, such as those obtained by condensation reactions of polyhydric alcohols and dibasic acids or reactive derivatives thereof, in the presence of a catalyst. More particularly, the invention relates to the use of antimonyl derivatives of polyhydric phenols containing orthodihydroxy groupings as catalysts in the preparation of fiber-forming polyesters.

In the present day commercial manufacture of high polymeric polymethylene terephthalates it is common practice to use as starting materials a dialkyl terephthalate and a glycol, for example, dimethyl terephthalate and ethylene glycol. However, provided terephthalic acid of a sufficient degree of purity can be obtained, the dimethyl terephthalate can be replaced by terephthalic acid. The terephthalic acid or the dialkyl ester thereof is subjected to esterification or ester-interchange with the glycol, preferably in the presence of a suitable catalyst and if desired under superatmospheric pressure conditions. The bis-hydroxyalkyl terephthalate and low polymers thus formed are polycondensed, desirably under reduced pressure and preferably in the presence of a polycondensation catalyst until a filament and fiber-forming high polymeric polymethylene terephthalate is obtained.

In the commercial preparation of polyesters, the use of a polycondensation catalyst to produce in short periods of time a fiber-forming polymer of high molecular weight having a lack of discoloration is very desirable. There have been many polycondensation catalysts proposed for use in the preparation of polyesters. However, these prior art catalysts have been lacking in that either too long a time of polymerization is needed to produce a polymer having the desired degree of polymerization or a discolored polymer is produced. Therefore, a catalyst that would enable the preparation of polyesters having a high molecular weight and desirable color characteristics in a relatively short period of time is desirable.

It is an object of this invention to provide an improved process for the polymerization of reactive intermediates obtained from glycol and dicarboxylic acids or polyester-forming derivatives thereof into high molecular weight polyesters.

It is another object of this invention to provide a new and improved process for producing polyethylene terephthalate through the use of novel catalysts that accelerate the polyester-forming reactions.

It is a further object of this invention to provide a catalyzed process for preparing polymeric polyesters which have excellent color characteristics.

Other objects and advantages of this invention will be apparent from the description thereof which follows.

The objects of this invention are accomplished by conducting the polymerization of the reactive intermediates obtained from glycols and dicarboxylic acids or polyester-forming derivatives thereof into high molecular weight polyesters in the presence of catalytic amounts of an antimonyl derivative of a polyhydric phenol containing an orthodihydroxy grouping.

The antimonyl catalysts of this invention may be prepared by reacting any polyhydric phenol containing an ortho-dihydroxy grouping, e.g., a catechol or a pyrogallol, with antimony trichloride in the presence of saturated sodium chloride solution. For example, the reaction of a solution of antimony trichloride in brine with a warm solution of catechol, also in brine forms o-phenylene antimonate (III) and the corresponding chloride according to the following equation:

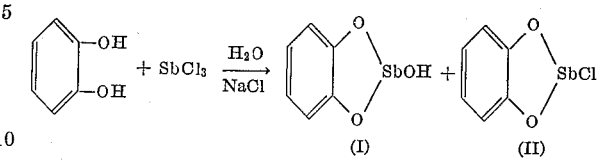

The mixture obtained may be completely converted to the chloride by treatment with concentrated hydrochloric acid. Complete conversion to the o-phenylene antimonate (III) may be obtained by warming the reaction mixture with water. The preparations of these compounds are described in "Organic Derivatives of Antimony" by W. G. Christiansen, No. 24 in the American Chemical Society Monograph series; Chemical Catalog Co., Inc. New York, 1925, pp. 198 to 203. The mixture or the individual compounds (I and II) may be used as catalysts within the purview of this invention. In addition the benzene ring of these catalysts may contain alkyl or aryl substituents if desired.

Illustrative of antimonyl derivatives of polyhydric phenols containing an ortho-dihydroxy grouping that may be used as catalysts are the reaction products of antimony trichloride and pyrogallol, catechol, p-phenyl catechol, 4,6-dimethylcatechol, 4-methylcatechol, 4-methyl-6-tertiary butyl catechol, 4-tertiary butyl catechol, 1,2- dihydroxynaphthalene, 4-chlorocatechol, pyrogallol carboxylic acid, gallic acid, and the like.

The amount of an antimonyl catalyst employed should be from about 0.01 to 0.5 percent by weight, based on the weight of dicarboxylic acid or ester-forming derivative thereof used. It is preferred that the amount of catalyst used be from about 0.03 to 0.1 percent by weight, based on the weight of dicarboxylic acid or ester-forming derivative thereof used. The particular antimonyl compound to be used as a catalyst may be added to the reaction of any point prior to the polymerization step.

It is advantageous to add a color stabilizer to the polyester compositions along with the catalysts of this invention to insure a high degree of color stability. The color stabilizer would be present in amounts of from about 0.03 to 0.30 percent by weight, based on the weight of the total composition. It is preferred that a phosphorous-containing stabilizer be used. When used with many polyester catalysts, these phosphorous-containing stabilizers must be added after the polymerization step because the stabilizer appears to destroy the catalytic activity of most catalysts. However, when used with the catalysts of this invention, the stabilizers may be added at any point during the preparation of the polyester, e.g., with the initial reactants, before polymerization, or after polymerization.

Particularly effective as color stabilizers are compounds selected from the group consisting of phosphite-polyphosphonate compounds having the formula

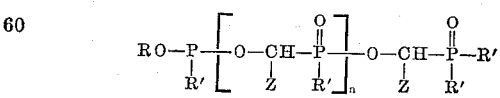

wherein R is selected from the class consisting of alkyl, haloalkyl, alkenyl, haloalkenyl, alkoxyalkyl, aryloxyalkyl, alkoxyhaloalkyl, and arylhaloalkyl radicals of from 1 to 12 carbon atoms, R' is selected from the class consisting of —OR and aromatic hydrocarbyl and halohydrocarbyl radicals of from 6 to 12 carbon atoms, Z is selected from the class consisting of hydrogen, and hydrocarbyl, halohydrocarbyl, carboalkoxyhydrocarbyl, alkylthiohydrocarbyl, alkoxyhydrocarbyl, and cyanohydrocarbyl radicals of from 1 to 17 carbon atoms, and the furyl and thienyl radicals and $n$ is a number of at least 1 and polyphosphonates having the formula

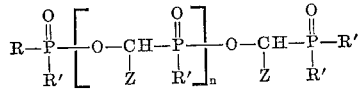

wherein R is selected from the class consisting of haloalkyl, haloalkenyl, alkoxyhaloalkyl, and aryloxyhaloalkyl radicals of from 1 to 12 carbon atoms, R' is selected from the class consisting of —OR, —O-hydrocarbyl and hydrocarbyl radicals of from 1 to 12 carbon atoms and aromatic halohydrocarbyl radicals of from 6 to 12 carbon atoms, Z is selected from the class consisting of hydrogen, hydrocarbyl, halohydrocarbyl, cyanohydrocarbyl, carboalkoxyhydrocarbyl, alkoxyhydrocarbyl and alkylthiohydrocarbyl radicals of from 1 to 17 carbon atoms and thienyl and duryl radicals and $n$ is a number of at least 1. These compounds and their preparation are discussed in U.S. Patent 3,014,954 to Birum and U.S. Patent 3,014,956 to Birum, both of which are incorporated herein by reference.

The synthetic linear condensation polyesters contemplated in the practice of the invention are those formed from dicarboxylic acids and glycols, and copolyesters or modifications of these polyesters and copolyesters. In a highly polymerized condition, these polyesters and copolyesters can be formed into filaments and the like and subsequently oriented permanently by cold drawing. The polyesters and copolyesters specifically useful in the instant invention are those resulting from heating one or more of the glycols of the series, $HO(CH_2)_nOH$, in which $n$ is an integer from 2 to 10, with one or more dicarboxylic acids or ester-forming derivatives thereof. Among the dicarboxylic acids and ester-forming derivatives thereof useful in the present invention there may be named terephthalic acid, isophthalic acid, sebacic acid, adipic acid, p-carboxyphenylacetic acid, succinic acid, p,p'-dicarboxybiphenyl, p,p'-dicarboxycarbanilide, p,p'-dicarboxythiocarbanilide, p,p'-dicarboxydiphenylsulfone, p - carboxyphenoxyacetic acid, p - carboxyphenoxypropionic acid, p-carboxyphenoxybutyric acid, p-carboxyphenoxyvaleric acid, p-carboxyphenoxyhexanoic acid, p - carboxyphenoxy heptanoic acid, p,p' - dicarboxydiphenylmethane, p,p' - dicarboxydiphenylethane, p,p' - dicarboxydiphenylpropane, p,p' - dicarboxydiphenylbutane, p,p' - dicarboxydiphenylpentane, p,p'-dicarboxydiphenylhexane, p,p'-dicarboxydiphenylheptane, p,p'-dicarboxydiphenyloctane, p,p' - dicarboxydiphenoxyethane, p,p' - dicarboxydiphenoxypropane, p,p' - dicarboxydiphenoxybutane, p,p'-dicarboxydiphenoxypentane, p,p'-dicarboxydiphenoxyhexane, 3-alkyl-4-(beta-carboxy ethoxy) benzoic acid, oxalic acid, glutaric acid, pimelic acid, suberic acid, azelaic acid and the dioxy acids of ethylene dioxide having the general formula $$HOOC—(CH_2)_n—O—CH_2CH_2—O—(CH_2)_n—COOH$$

wherein $n$ is an integer from 1 to 4, and the aliphatic and cycloaliphatic aryl esters and half esters, ammonium and amine salts, and the acid halides of the above-named compounds and the like. Examples of the glycols which may be employed in practicing the instant invention are ethylene glycol, trimethylene glycol, tetramethylene glycol and decamethylene glycol, and the like. Polyethylene terephthalate, however, is the preferred polyester because of the ready availability of terephthalic acid and ethylene glyocl, from which it is made. It also has a relatively high melting point of about 250 through 265° C. and this property is particularly desirable in the manufacture of filaments in the textile industry.

Among the modified polyesters and copolyesters which are useful in the practice of the instant invention are the polyesters and copolyesters mentioned above modified with chain terminating groups having hydrophilic properties, such as the monofunctional ester-forming polyesters bearing the general formula

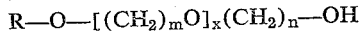

wherein R is an alkyl group containing 1 to 18 carbon atoms or an aryl group containing 6 to 10 carbon atoms, and $m$ and $n$ are integers from 2 to 22 and $x$ is a whole number indicative of the degree of polymerization, that is, $x$ is an integer from 1 to 100 or greater. Examples of such compounds are methoxypolyethylene glycol, ethoxypolyethylene glycol, n-propoxypolyethylene glycol, isopropoxypolyethylene glycol, butoxypolyethylene glycol, phenoxypolyethylene glycol, methoxypolypropylene glycol, methoxypolybutylene glycol, phenoxypolypropylene glycol, phenoxypolybutylene glycol, methoxypolymethylene glycol, phenoxypolymethylene glycol, and the like. Suitable polyalkylvinyl ethers having one terminal hydroxyl group are the addition polymers prepared by the homopolymerization of alkylvinyl ethers wherein the alkyl group contains from 1 to 4 carbon atoms. Examples of such chain-terminating agents are polymethylvinyl ether, polyethylvinyl ether, polypropylvinyl ether, polybutylvinyl ether, polyisobutylvinyl ether, and the like. The chain-terminating agents or compounds may be employed in the preparation of the modified polyesters in amounts ranging from 0.05 mole percent to 4.0 mole percent, based on the amount of dicarboxylic acid or dialkyl ester thereof employed in the reaction mixture. It is to be noted that when chain-terminating agents are employed alone, i.e., without a chain-branching agent, the maximum amount that can be employed in the reaction mixture is 1.0 mole percent. Thus, unexpectedly, the addition of controlled amounts of chain-branching agents along with the chain-terminating agents allows the introduction of an increased amount of the latter into the polymer chain than is otherwise possible when employing the chain-terminating agents alone.

One will readily appreciate that the weight percent of chain-terminating agent which may be employed in this invention will vary with the molecular weight of the agent. The range of average molecular weights of the chain-terminating agents suitable for use in this invention is from 500 to 5000, with those agents having a molecular weight in the range of 1000 to 3500 being preferred.

Materials suitable as chain-branching agents or cross-linking agents, which are employed to increase the viscosity or molecular weight of the polyesters, are the polyols which have a functionality greater than two, that is, they contain more than two functional groups, such as hydroxyl. Examples of suitable compounds are pentaerythritol; compounds having the formula:

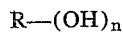

wherein R is an alkyl group containing from 2 to 6 carbon atoms and $n$ is an integer from 3 to 6, for example, glycerol, sorbitol, hexane triol-1,2,6, and the like; compounds having the formula:

wherein R is an alkyl group containing from 2 to 6 carbon atoms, for example, trimethylol ethane, trimethylol propane, and the like compounds up to trimethylol hexane; and the compounds having the formula:

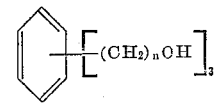

wherein $n$ is an integer from 1 to 6. As examples of compounds having the above formula there may be named trimethylol benzene-1,3,5, triethylol benzene-1,3,5, tripropylol benzene-1,3,5, tributylol benzene-1,3,5, and the like.

Aromatic polyfunctional acid esters may also be emplayed in this invention as chain-branching agents and particularly those having the formula

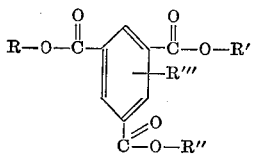

and in which R, R' and R" are alkyl groups containing 1 to 3 carbon atoms and R''' is hydrogen or alkyl groups having 1 to 2 carbon atoms. As examples of compounds having the above formula there may be named trimethyl trimesate, tetramethyl pyromellitate, tetramethyl mellophanate, trimethyl hemimellitate, trimethyl trimellitate, tetramethyl prehnitate, and the like. In addition, there may be employed mixtures of the above esters which are obtained in practical synthesis. That is, in most instances, when preparing any of the compounds having the above formula, other related compounds having the same formula may be present in small amounts as impurities. This does not affect the compound as a chain-branching agent in the preparation of the modified polyesters and copolyesters described herein.

The chain-branching agents or cross-linking agents may be employed in the preparation of the polyesters and copolyesters in amounts ranging from 0.05 mole percent to 2.4 mole percent, based on the amount of dicarboxylic acid or dialkyl ester thereof employed in the reaction mixture. The preferred range of chain-branching agent for use in the present invention is from 0.1 to 1.0 mole percent.

In the practice of the present invention, the dibasic acid or ester thereof and the glycol are charged to the reaction vessel at the beginning of the first stage of the esterification reaction and the reaction proceeds as in any well-known esterification polymerization. If desired, the calculated amounts of chain-terminating agent or chain-terminating agent and chain-branching agent or cross-linking agent are also charged to the reaction vessel at this time.

When preparing the polyester from an ester, such as dimethyl terephthalate, the first stage of reaction is carried out at about 170–180° C. and at a pressure of 0 to 7 p.s.i.g. If the polyester is prepared from the acid, such as terephthalic acid, the first stage of reaction is carried out at about 220–260° C. and at a pressure of 15 to 60 p.s.i.g. The methanol or water evolved during the first stage of reaction is continuously removed by distillation. At the completion of the first stage, the excess glycol, if any, is distilled off prior to entering the second stage of the reaction.

In the second or polymerization stage, the reaction is conducted at reduced pressures and preferably in the presence of an inert gas, such as nitrogen, in order to prevent oxidation. This can be accomplished by maintaining a nitrogen blanket over the reactants, said nitrogen containing less than 0.003 percent oxygen. For optimum results, a pressure within the range of less than 1 mm. up to 5 mm. of mercury is employed. This reduced pressure is necessary to remove the free ethylene glycol that is formed during this stage of the reaction, the ethylene glycol being volatilized under these conditions and removed from the system. The polymerization step is conducted at a temperature in the range of 220° C. to 300° C. This stage of the reaction may be effected either in the liquid, melt or solid phase. In the liquid phase, particularly, reduced pressures must be employed in order to remove the free ethylene glycol which emerges from the polymer as a result of the condensation reaction.

Although the process of this invention may be conducted stepwise, it is particularly adaptable for use in the continuous production of polyesters. In the preparation of the described polyesters, the first stage of the reaction takes place in approximately ¾ to 2 hours. The use of an ester-interchange catalyst is desirable when starting with dimethyl terephthalate. In the absence of a catalyst, times up to 6 hours may be necessary in order to complete this phase of the reaction. In the polymerization stage, a reaction time of approximately 1 to 4 hours may be employed with a time of 1 to 3 hours being the optimum, depending on catalyst concentration, temperature, viscosity desired, and the like.

The linear condensation polyesters, produced in accordance with the present invention, have specific viscosities in the order of about 0.25 to 0.6, which represent the fiber- and filament-forming polymers. It is to be understood, of course, that non-fiber-forming polyesters may be produced by means of the present invention, which have a greater or less melt viscosity than that recited above. For example, polyesters which are useful in coating compositions, lacquers, and the like are within the scope of the present invention.

Specific viscosity, as employed herein, is represented by the formula:

$$\mathrm{Nsp} = \frac{\text{Time of flow of the polymer solution in seconds}}{\text{Time of flow of the solvent in seconds}} - 1$$

Viscosity determinations of the polymer solutions and solvent are made by allowing said solutions and solvent to flow by force of gravity at 25° C. through a capillary viscosity tube. In all determinations of the polymer solution viscosities, a polymer containing 0.5 percent by weight of the polymer dissolved in a solvent mixture containing two parts by weight of phenol and one part by weight of 2,4,6-trichlorophenol, and 0.5 percent by weight of water, based on the total weight of the mixture, is employed.

The polyesters of this invention may be produced to form filaments and films by melt spinning methods and can be extruded or drawn in the molten state to yield products that can be subsequently cold drawn to the extent of several hundred percent of their original lengths, whereby molecularly oriented structures of high tenacity may be obtained. The condensation product can be cooled and comminuted followed by subsequent remelting and processing to form filaments, films, molded articles, and the like.

Alternatively the polyesters of this invention may be processed to shaped objects by the wet spinning method, wherein the polyesters are dissolved in a suitable solvent and the resulting solution extruded through a spinneret into a bath composed of a liquid that will extract the solvent from the solution. As a result of this extraction, the polyester is coagulated into filamentary material. The coagulated material is withdrawn from the bath and is then generally subjected to a stretching operation in order to increase the tenacity and to induce molecular orientation therein. Other treating and processing steps may be given the oriented filaments.

If it is desired to produce shaped articles from the polyesters of the present invention which have a modified appearance or modified properties, various agents may be added to the polyester prior to the fabrication of the articles or these agents may be incorporated with the initial reactants. Such added agents might be plasticizers, anti-static agents, fire-retarding agents, stabilizers, and the like.

To further illustrate the present invention and the advantages thereof, the following specific examples are given, it being understood that these are merely intended to be illustrative and not limitative. Unless otherwise indicated, all parts and percents are by weight.

The yarn color test employed in the examples consisted of determinations on the proximity to complete whiteness by reflectance measurements made by using a spectrophotometer. The methods used were those recommended by the Standard Observer and Coordinate System of the International Commision on Illumination as fully set forth in the Handbook of Colorimetry, published in 1936 by the Technology Press, Massachusetts Institute of Technology. The results are to be interpreted as approaching complete whiteness to the degree that the values given approach 100, which is taken as the complete whiteness value.

The specific viscosity values given in the examples were determined at zero spinning times and were measured at about 25° C. in a mixture of 133.5 grams of phenol, 66.8 grams of trichlorophenol, and 1 gram of water.

EXAMPLE 1

A charge containing 200 grams of terephthalic acid, 400 ml. of ethylene glycol, 0.5 gram of calcium terephthalate, and 0.75 gram of zinc hexafluotitanate was added directly to a polyester autoclave and the system was purged 6 times with nitrogen, allowing the pressure to rise to 150 p.s.i.g., and then releasing it slowly to atmospheric pressure each time. The maximum rate of heating was then applied to the closed system, and when the temperature inside the bomb had reached 100 to 125° C., the stirrer was slowly started. When the temperature of the outside wall of the autoclave had reached about 250° C. (the inside temperature being about 230–235° C. and the pressure being about 25 p.s.i.g.), the off-vapor valve was adjusted to maintain these conditions of temperature and pressure. As the first distillate containing water and some ethylene glycol appeared, the esterification stage was considered to have started. The stirrer speed was set at 150 r.p.m. The esterification step took about 40 minutes for completion, after which the pressure of the system was adjusted to atmospheric pressure. The heating rate was then increased until the temperature reached about 280° C. During this time, excess ethylene glycol was distilled off. An ethylene glycol slurry of titanium dioxide was introduced through an injection port when the inside temperature had reached about 260° C. to 265° C. When the inside temperature reached about 280 C., vacuum was applied. The inside temperature was maintained at about 280° C. and the pressure was maintained at about 0.1 mm. Hg, and the polymerization continued until a polymer having a specific viscosity of 0.285 was obtained. The polymerization time for preparing the polymer was 23 minutes.

Fiber was spun from the polymer prepared above using conventional melt spinning procedures. However, the fiber had a dirty yellow color and had a whiteness value of less than 45.

This example shows the use of a known polyester polymerization catalyst to produce a high molecular weight polymer in a short polymerization time. However, the resulting fiber had very poor whiteness.

EXAMPLE 2

A polyester autoclave was charged with 200 grams of terephthalic acid, 400 ml. of ethylene glycol, and 0.165 gram of a mixture comprising o-phenylene antimonate (III) and the corresponding chloride (the reaction product of catechol and antimony trichloride). Polyethylene terephthalate having a specific viscosity of 0.441 was prepared from this mixture following the procedure of Example 1. The polymerization time for preparing the polymer was 100 minutes.

Fiber was spun from the polymer prepared above using conventional melt spinning procedures. The fiber was found to have a whiteness value of 73.

EXAMPLE 3

A polyester autoclave was charged with 200 grams of terephthalic acid, 400 ml. of ethylene glycol, and 0.165 gram of o-phenylene antimonate (III). Polyethylene terephthalate having a specific viscosity of 0.301 was prepared from this mixture following the procedure of Example 1. The polymerization time for preparing the polymer was 33 minutes.

Fiber was spun from the polymer prepared above using conventional melt spinning procedures. This fiber was found to have a whiteness value of 79.

EXAMPLE 4

Polyethylene terephthalate was produced using the autoclave charge and procedure of Example 3 except that 0.3 ml. of a phosphite-polyphosphonate of the formula

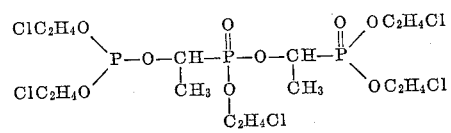

was included in the initial charge. The polymerization time for preparing the polyethylene terephthalate was 37 minutes and the polymer obtained had a specific viscosity of 0.323.

Fiber was spun from the polymer prepared above using conventional melt spinning procedures. This fiber had a whiteness value of 88. Fiber collected after a spinning time of 30 minutes had a whiteness value of 87.

EXAMPLE 5

A polyester autoclave was charged with 200 grams of terephthalic acid, 400 ml. of ethylene glycol, and 0.165 gram of a mixture comprising o-phenylene antimonate (III) and the corresponding chloride (the reaction product of catechol and antimony trichloride). Polyethylene terephthalate having a specific viscosity of 0.334 was prepared from this mixture following the procedure of Example 1. The polymerization time for preparing the polymer was 55 minutes.

Fiber was spun from the polymer prepared above using conventional melt spinning procedures. This fiber was found to have a whiteness value of 73.

EXAMPLE 6

A polyester autoclave was charged with 200 grams of terephthalic acid, 400 ml. of ethylene glycol, and 0.06 gram of o-phenylene antimonate (III). Polyethylene terephthalate having a specific viscosity of 0.229 was prepared from this mixture following the procedure of Example 1. The polymerization time for preparing the polymer was 47 minutes.

Fiber was spun from the polymer prepared above using conventional melt spinning procedures. The fiber had a whiteness value of 85.

EXAMPLE 7

A polyester autoclave was charged with 200 grams of terephthalic acid, 400 ml. of ethylene glycol, 0.5 gram of o-phenylene antimonate (III), and 0.1 ml. of a polyphosphonate of the formula

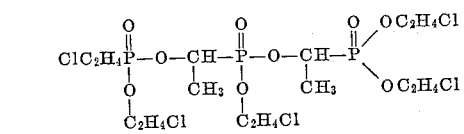

Polyethylene terephthalate having a specific viscosity of 0.294 was prepared from this mixture following the procedure of Example 1. The polymerization time for preparing the polymer was 40 minutes.

Fiber was spun from the polymer prepared above using conventional melt spinning procedures. The fiber had a whiteness value of 80.

The polymers prepared using the catalysts of this invention appear to be quite stable in the melt when compared with polymers prepared using other catalysts. The following table shows comparative data using the catalysts of this invention and other catalysts:

| Catalyst | Polymer Nsp | | Percent Nsp Decrease |
|---|---|---|---|
| | At 0 min. spinning | At 40 min. spinning | |
| Sb₂O₃* | .334 | .313 | 6.1 |
| NaSbF₆* | .331 | .309 | 6.5 |
| Zinc glycoloxide* | .331 | .295 | 11.0 |
| ZnSiF₆* | .321 | .301 | 6.4 |
| o-Phenylene antimonate (III) | .299 | .291 | 2.7 |
| Do | .294 | .294 | 0.0 |
| Reaction product of catechol and antimony | .334 | .330 | 1.2 |
| o-Phenylene antimonate (III) | .301 | .305 | −1.3 |

*In each of the above runs the procdure of Example 1 was used.

In each run an amount of catalyst was used to provide an equivalent amount of metal based upon the use of 0.165 gram of o-phenylene antimonate (III).

It is to be understood that changes and variations may be made in the present invention without departing from the spirit and scope thereof as defined in the appended claims.

What is claimed is:

1. In a process for producing synthetic, highly polymeric polyesters wherein a compound selected from the group consisting of dicarboxylic acids and ester-forming derivatives thereof and a molar excess of a polymethylene glycol having the formula, $HO(CH_2)_nOH$, wherein $n$ is an integer from 2 to 10 are reacted under polyesterification conditions and the reaction is continued until a highly polymeric product is formed, the improvement which comprises carrying out the polymerization step in the presence of a catalytic amount of a catalyst selected from the group consisting of o-phenylene antimonate (III), o-phenylene chloroantimonate (III) and mixtures thereof.

2. In a process for producing synthetic, highly polymeric polyesters wherein a compound selected from the group consisting of dicarboxylic acids and ester-forming derivatives thereof and a molar excess of a polymethylene glycol having the formula, $HO(CH_2)_nOH$, wherein $n$ is an integer from 2 to 10 are reacted under polyesterification conditions and the reaction is continued until a highly polymeric product is formed, the improvement which comprises carrying out the polymerization step in the presence of from about 0.01 to 0.5 percent by weight, based on the weight of the selected compound, of a catalyst selected from the group consisting of o-phenylene antimonate (III), o-phenylene chloroantimonate (III) and mixtures thereof.

3. In a process for producing synthetic, highly polymeric polyesters wherein a compound selected from the group consisting of dicarboxylic acids and ester-forming derivatives thereof and a molar excess of a polymethylene glycol having the formula, $HO(CH_2)_nOH$, wherein $n$ is an integer from 2 to 10 are reacted under polyesterification conditions and the reaction is continued until a highly polymeric product is formed, the improvement which comprises carrying out the polymerization step in the presence of from about 0.03 to 0.1 percent by weight, based on the weight of the selected compound, of a catalyst selected from the group consisting of o-phenylene antimonate (III), o-phenylene chloroantimonate (III) and mixtures thereof.

4. In a process for producing synthetic, highly polymeric polyesters wherein a compound selected from the group consisting of dicarboxylic acids and ester-forming derivatives thereof and a molar excess of a polymethylene glycol having the formula, $HO(CH_2)_nOH$, wherein $n$ is an integer from 2 to 10 are reacted under polyesterification conditions and the reaction is continued until a highly polymeric product is formed, the improvement which comprises carrying out the polymerization step in the presence of from about 0.01 to 0.5 percent by weight, based on the weight of the selected compound of a catalyst selected from the group consisting of o-phenylene antimonate (III), o-phenylene chloroantimonate (III) and mixtures thereof and from about 0.03 percent to 0.30 percent by weight, based on the weight of the selected compound, of a color stabilizer selected from the group consisting of phosphite-polyphosphonate compounds having the formula

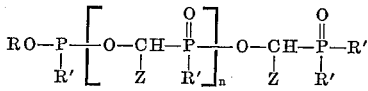

wherein R is selected from the class consisting of alkyl, haloalkyl, alkenyl, haloalkenyl, alkoxyalkyl, aryloxyalkyl, alkoxyhaloalkyl and aryloxyhaloalkyl radicals of from 1 to 12 carbon atoms, R' is selected from the class consisting of —OR and aromatic hydrocarbyl and halohydrocarbyl radicals of from 6 to 12 carbon atoms, Z is selected from the class consisting of hydrogen and hydrocarbyl, halohydrocarbyl, carboalkoxyhydrocarbyl, alkylthiohydrocarbyl, alkoxyhydrocarbyl, and cyanohydrocarbyl radicals of from 1 to 17 carbon atoms, and the furyl and thienyl radicals and $n$ is a number of at least 1 and polyphosphonates having the formula

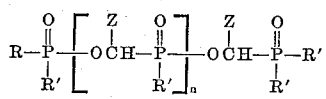

wherein R is selected from the class consisting of haloalkyl, haloalkenyl, alkoxyhaloalkyl and aryloxyhaloalkyl radicals of from 1 to 12 carbon atoms, R' is selected from the class consisting of —OR, —O-hydrocarbyl and hydrocarbyl radicals of from 1 to 12 carbon atoms and aromatic halohydrocarbyl radicals of from 6 to 12 carbon atoms, Z is selected from the class consisting of hydrogen, hydrocarbyl, halohydrocarbyl, cyanohydrocarbyl, carboalkoxyhydrocarbyl, alkoxyhydrocarbyl and alkylthiohydrocarbyl radicals of from 1 to 17 carbon atoms and the thienyl and furyl radicals and $n$ is a number of at least 1.

5. In a process for the production of a synthetic, highly polymeric polyester which comprises the steps of forming a reaction mixture of a compound selected from the group consisting of dicarboxylic acids and ester-forming derivatives thereof and a molar excess of a polymethylene glycol having the formula, $HO(CH_2)_nOH$, wherein $n$ is an integer from 2 to 10, heating said reaction mixture into an elevated temperature sufficient to induce the reaction between the selected compound and the glycol, maintaining the reaction mixture at the elevated temperature until the reaction is substantially completed, continuously removing the by-products by distillation as they are formed during the reaction, then raising the temperature of the reaction mixture in a range of above the boiling point of the glycol to remove excess glycol in the reaction mixture, and maintaining the reaction mixture at an elevated temperature and under a reduced pressure until a highly polymeric product is formed, the improvement which comprises carrying out the polymerization step in the presence of a catalytic amount of a catalyst selected from the group consisting of o-phenylene antimonate (III), o-phenylene chloroantimonate (III) and mixtures thereof.

6. In a process for the production of a synthetic, highly polymeric polyester which comprises the steps of forming a reaction mixture of a compound selected from the group consisting of dicarboxylic acids and ester-forming derivatives thereof and from about 2 to 20 moles per mole of the selected compound of a polymethylene glycol having the formula, $HO(CH_2)_nOH$, wherein $n$ is an integer from 2 to 10, heating said reaction mixture to an elevated temperature sufficient to induce the reaction between the selected compound and the glycol, maintaining the reaction mixture at the elevated temperature until the reaction is substantially completed, continuously removing the by-products by distillation as they are formed during the reaction, then raising the temperature of the reaction mixture in a range above the boiling point of said glycol to remove excess glycol in the reaction mixture, and maintaining the reaction mixture at an elevated temperature and under a reduced pressure until a highly polymeric product is formed, the improvement which comprises carrying out the polymerization step in the presence of from about 0.01 to 0.5 percent by weight, based on the weight of the selected compound, of a catalyst selected from the group consisting of o-phenylene antimonate (III), o-phenylene chloroantimonate (III) and mixtures thereof.

7. In a process for the production of a synthetic, highly polymeric polyester which comprises the steps of forming a reaction mixture of a compound selected from the group consisting of dicarboxylic acids and ester-forming derivatives thereof and from about 2 to 20 moles per mole of the selected compound of a polymethylene glycol having the formula, $HO(CH_2)_nOH$, wherein $n$ is an integer from 2 to 10, heating said reaction mixture to an elevated temperature sufficient to induce the reaction between the selected compound and the glycol, maintaining the reaction mixture at the elevated temperature until the reaction is substantially completed, continuously removing the by-products by distillation as they are formed during the reaction, then raising the temperature of the reaction mixture in a range above the boiling point of said glycol to remove excess glycol in the reaction mixture, and maintaining the reaction mixture at an elevated temperature and under a reduced pressure until a highly polymeric product is formed, the improvement which comprises carrying out the polymerization step in the presence of from about 0.03 to 0.1 percent by weight, based on the weight of the selected compound, of a catalyst selected from the group consisting of o-phenylene antimonate (III), o-phenylene chloroantimonate (III) and mixtures thereof.

8. In a process for the production of a synthetic, highly polymeric polyester which comprises the steps of forming a reaction mixture of a member selected from the group consisting of dicarboxylic acids and ester-forming derivatives thereof and from about 2 to 20 moles per mole of the selected compound of a polymethylene glycol having the formula, $HO(CH_2)_nOH$, wherein $n$ is an integer from 2 to 10, heating said reaction mixture to an elevated temperature sufficient to induce the reaction between the selected compound and the glycol, maintaining the reaction mixture at the elevated temperature until the reaction is substantially completed, continuously removing the by-products by distillation as they are formed during the reaction, then raising the temperature of the reaction mixture in a range above the boiling point of said glycol to remove excess glycol in the reaction mixture, and maintaining the reaction mixture at an elevated temperature and under a reduced pressure until a synthetic polyester having fiber-forming properties is formed, the improvement which comprises carrying out the polymerization step in the presence of from about 0.03 to 0.1 percent by weight, based on the weight of the selected compound, of a catalyst selected from the group consisting of o-phenylene antimonate (III), o-phenylene chloroantimonate (III) and mixtures thereof.

9. In a process for the production of a synthetic, highly polymeric polyester which comprises the steps of forming a reaction mixture of a compound selected from the group consisting of dicarboxylic acids and ester-forming derivatives thereof and from about 2 to 20 moles per mole of the selected compound of a polymethylene glycol having the formula, $HO(CH_2)_nOH$, wherein $n$ is an integer from 2 to 10, heating said reaction mixture to an elevated temperature sufficient to induce the reaction between the selected compound and the glycol, maintaining the reaction mixture at the elevated temperature until the reaction is substantially completed, continuously removing the by-products by distillation as they are formed during the reaction, then raising the temperature of the reaction mixture in a range above the boiling point of said glycol to remove excess glycol in the reaction mixture, and maintaining the reaction mixture at an elevated temperature and under a reduced pressure until a highly polymeric product is formed, the improvement which comprises carrying out the polymerization step in the presence of from about 0.01 to 0.5 percent by weight, based on the weight of the selected compound, of a catalyst selected from the group consisting of o-phenylene antimonate (III), o-phenylene chloroantimonate (III) and mixtures thereof and from about 0.03 to 0.30 percent by weight, based on the weight of the selected compound, of a color stabilizer selected from the group consisting of phosphite-polyphosphonate compounds having the formula

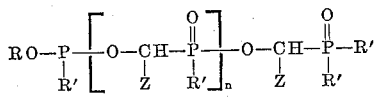

wherein R is selected from the class consisting of alkyl, haloalkyl, alkenyl, haloalkenyl, alkoxyalkyl, aryloxyalkyl, alkoxyhaloalkyl and aryloxyhaloalkyl radicals of from 1 to 12 carbon atoms, R' is selected from the class consisting of —OR and aromatic hydrocarbyl and halohydrocarbyl radicals of from 6 to 12 carbon atoms, Z is selected from the class consisting of hydrogen and hydrocarbyl, halohydrocarbyl, carboalkoxyhydrocarbyl, alkylthiohydrocarbyl, alkoxyhydrocarbyl, and cyanohydrocarbyl radicals of from 1 to 17 carbon atoms, and the furyl and thienyl radicals and $n$ is a number of at least 1 and polyphosphonates having the formula

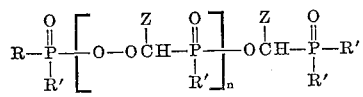

wherein R is selected from the class consisting of haloalkyl, haloalkenyl, alkoxyhaloalkyl and aryloxyhaloalkyl radicals of from 1 to 12 carbon atoms, R' is selected from the class consisting of —OR, —O-hydrocarbyl and hydrocarbyl radicals of from 1 to 12 carbon atoms and aromatic halohydrocarbyl radicals of from 6 to 12 carbon atoms, Z is selected from the class consisting of hydrogen, hydrocarbyl, halohydrocarbyl, cyanohydrocarbyl, carboalkoxyhydrocarbyl, alkoxyhydrocarbyl and alkylthiohydrocarbyl radicals of from 1 to 17 carbon atoms and the thienyl and furyl radicals and $n$ is a number of at least 1.

10. In a process for producing highly polymeric polyethylene terephthalate wherein terephthalic acid and ethylene glycol are reacted under polyesterification conditions and the reaction is continued until a highly polymeric product is formed, the improvement which comprises carrying out the polymerization step in the presence of from about 0.01 to 0.5 percent by weight, based on the weight of the terephthalic acid, of a catalyst selected from the group consisting of o-phenylene antimonate (III), o-phenylene chloroantimonate (III) and mixtures thereof.

11. The process as defined in claim 10 wherein the catalyst used is o-phenylene antimonate (III).

12. The process as defined in claim 10 wherein the catalyst used is o-phenylene chloroantimonate (III).

13. The process as defined in claim 10 wherein the catalyst used is a mixture of o-phenylene antimonate (III) and o-phenylene chloroantimonate (III).

14. In a process for the production of a highly polymeric polyethylene terephthalate which comprises the steps of forming a reaction mixture of terephthalic acid and from about 2 to 20 moles per mole of terephthalic acid, of ethylene glycol, heating said reaction mixture to an elevated temperature sufficient to induce the reaction between the acid and the glycol, maintaining the reaction mixture at the elevated temperature until the reaction is substantially completed, continuously removing the water as it is formed during the reaction, then raising the temperature of the reaction mixture in a range above the boiling point of the glycol to remove excess glycol in the reaction mixture, and maintaining the reaction mixture at an elevated temperature and under a reduced pressure until polyethylene terephthalate having fiber-forming properties is formed, the improvement which comprises carrying out the polymerization step in the presence of from about 0.03 to 0.1 percent by weight, based on the weight of the terephthalic acid, of a catalyst selected from the group consisting of o-phenylene antimonate (III), o-phenylene chloroantimonate (III) and mixtures thereof.

15. The process as defined in claim 14 wherein the catalyst used is o-phenylene antimonate (III).

16. The process as defined in claim 14 wherein the catalyst used is o-phenylene chloroantimonate (III).

17. The process as defined in claim 14 wherein the catalyst used is a mixture of o-phenylene antimonate (III) and o-phenylene chloroantimonate (III).

References Cited

UNITED STATES PATENTS

| | | | |
|---|---|---|---|
| 2,739,957 | 3/1956 | Billica et al. | 260—75 |
| 3,014,954 | 12/1961 | Birum | 260—45.7 |
| 3,014,956 | 12/1961 | Birum | 260—45.7 |
| 3,055,870 | 9/1962 | McIntyre et al. | 260—75 |

OTHER REFERENCES

Christiansen, Organic Derivatives of Antimony, Chemical Catalog Co., New York, 1925, pages 94–96.

DONALD E. CZAJA, *Primary Examiner.*

LEON J. BERCOVITZ, *Examiner.*

M. J. WELSH, *Assistant Examiner.*